3,004,963
PURIFYING POLYMERIZED OLEFINS PREPARED WITH CATALYTIC METAL COMPOUNDS AND COMPOSITIONS THEREBY OBTAINED
Frank A. Bartolomeo and Harvey D. Ledbetter, Lake Jackson, and James M. McDuff, Angleton, Tex., assignors to The Dow Chemical Company, Midland, Mich., a corporation of Delaware
No Drawing. Filed Sept. 16, 1955, Ser. No. 534,872
17 Claims. (Cl. 260—94.9)

This invention relates to a method for treating polymerized olefinic and other ethylenically unsaturated materials which have been prepared with catalytic metal compounds to improve their characteristics, particularly with regard to darkening and degradation, during subsequent shaping and forming operations and to compositions thereby obtained. In particular, it relates to a method for removing the greater part of the catalyst residues from such products to produce materials having unremoved portions of such residues in a substantially inactive condition.

Various olefins and other ethylenically unsaturated materials, particularly ethylene, may be efficiently polymerized, even as relatively impure materials, to relatively high molecular weight polymeric compounds at relatively low pressures and temperatures, according to a process first proposed by Karl Ziegler and his associates in Germany. In this process mixtures of strong reducing agents such as aluminum alkyls with compounds of group IV–B, V–B and VI–B metals of the periodic system including thorium and uranium are employed as catalysts for the polymerization. Polyethylenes, for example, having average molecular weights in excess of 50,000 and as large as 100,000 to 3,000,000 can be manufactured by polymerizing ethylene gas with such catalysts at temperatures beneath about 100° C. and under pressures less than about 100 atmospheres. It is preferable when employing such catalysts according to the Ziegler process to operate at temperatures of about 50° C. and under pressures between about 1 and 10 atmospheres. The reaction may suitably be conducted in the presence of an organic solvent such as hexane, benzene and the like.

The polyethylenes prepared by the Ziegler process have superior and highly desirable properties. For example, they may be made containing less than 3 and even less than 0.03 methyl groups per 100 methylene groups in the polymer molecule. The polymer molecules are practically completely linear and are crystalline almost to their melting points, which usually are in excess of 130° C. They are insoluble in most solvents at ordinary temperatures. Shaped articles formed with such polyethylenes have tear strengths between about 1400 and 2800 pounds per square inch. Unstretched films prepared from them have tensile strengths in excess of about 2800 pounds per square inch and may be oriented by stretching to polyethylene film structures having tensile strengths as high as about 42,500 pounds per square inch.

The strong reducing agents, which are advantageously employed in the catalyst mixtures of the Ziegler process include among other compounds a variety of aluminum trialkyls such as aluminum trimethyl, aluminum triethyl, aluminum tripropyl, aluminum triisobutyl and higher aluminum trialkyls as well as dialkyl aluminum halides and dialkyl aluminum hydrides. Salts of titanium, zirconium, uranium, thorium and chromium are preferably employed as the groups IV–B, V–B and VI–B metallic compounds in the catalyst although salts of the remaining metals in these subgroups may also be employed. Compounds of these metals including their halogenides, oxyhalogenides, complex halogenides, freshly precipitated oxides and hydroxides and such organic compounds as alcoholates, acetates, benzoates, acetyl acetonates and the like may be used in the catalyst.

A particularly active catalyst mixture for the Ziegler process may be obtained by mixing a titanium or zirconium compound, such as a tetrachloride, oxychloride or acetyl acetonate with the reducing agent, such as an aluminum alkyl. Amounts of the catalyst admixture varying from 0.01 to a few percent by weight, depending upon the degree of purity of the materials being polymerized may suitably be employed.

After polymerization according to the Ziegler process, however, polyethylene and similar polymerized products contain catalytically active residues from the admixed metallic catalyst employed. The residues are not completely removed by the conventionally utilized purification after treatments of polymeric materials prepared according to the Ziegler process. Such aftertreatment may involve filtration, preferably in the presence of air (which tends to lighten the color of the product), to separate the polymerization product from the reaction mass. This may be followed by sequential trituration with hexane, isopropanol, water, acetone, and pentane prior to drying. When higher catalyst concentrations are employed in the Ziegler process, some of the metallic compounds may be removed from the polymeric product by extracting it with methanolic hydrochloric acid then washing it in methanol or acetone. Repeated washings in butanol are also frequently employed to decompose and remove the catalyst residue from the polymer product.

It has been observed that the presence of oxidative metallic catalytic residues in polymeric materials prepared according to the Ziegler process tends to impart certain undesirable characteristics to the polymers. Catalyst residues as substantial as 200 to 2,000 p.p.m. by weight, depending on the molecular weight of the polymer, may frequently be found contained in such polymer products even when they are purified by the usually employed aftertreating procedures. Polymers containing such concentrations of residue, when subsequently molded or otherwise shaped in the presence of heat, tend to become darker than is desirable due to the presence of the catalyst residue. This seriously restricts the utility of polymers prepared according to the Ziegler process. Furthermore, the presence of aluminum and other heavy metal compounds in polymers prepared according to the Ziegler process tends also to induce darkening on exposure to light, particularly daylight, in a manner which is analogous to the phenomenon which occurs in ceramic glazes when aluminum and other heavy metal compounds are present.

While antioxidants and like compounds may sometimes be employed to stabilize organic materials against the effects of degradation induced by exposure to light and heat, the efficacy of such materials is often greatly diminished or even nullified in the presence of such metallic oxidation catalysts as are found in the catalyst residues remaining in polymeric products prepared according to the Ziegler process.

It would be advantageous to treat polyethylene and other polymers prepared according to the Ziegler process in such a manner to produce a final product having a lessened or eliminated tendency to darken or degrade upon being shaped, molded or otherwise formed into structures, particularly when exposed to heat or upon exposure to light. If a great portion of the heavy metal catalyst compounds were removed from such products and the remainder catalytically inactivated, the polymer products would display lessened or, for all practical purposes, eliminated propensities for oxidative degradation and would be less likely to darken in sunlight.

Therefore, it is among the objects of the present invention to treat polymerized olefinic and other ethylenically unsaturated materials, particularly polyethylene, which have been prepared with catalytic heavy-metal compounds in such a manner that they are less susceptible to being undesirably affected by heat and light. It is a further object of the present invention to provide polymers of this type which are relatively insensitive to heat and light. A still further object of the present invention is to treat such polymers to remove therefrom the substantially greater portion of the catalytic residues so that a polymer product prepared in accordance with the Ziegler process but having a relatively low level of catalytic heavy metal residues may be obtained. Another object of the present invention is to treat any catalytic heavy metal residues which may remain in such polymers in such a manner that they are substantially catalytically inactivated and incapacitated to promote oxidative degradation or sensitivity to light in the purified product. An additional object of the present invention is to provide a more simple and economical method for purifying polymer products particularly polyethylene, prepared according to the Ziegler process and to provide polymer products prepared in this manner.

These and other related objects may advantageously be accomplished according to the present invention by treating with a lower molecular weight hydroxyalkylamine the polymerized olefinic and other ethylenically unsaturated compounds, particularly polyethylene, prepared according to the herein described Ziegler process. Substantially all of the heavy metal catalyst residues are removed from the polymer products by this treatment. Any heavy metal catalyst residues which may remain in the polymer product after such treatment are substantially catalytically inactivated, probably due to their becoming complexed with the hydroxyalkylamine. In this form, their presence in the catalyst residue is incapable of exerting a deleterious influence on the polymer product when it is subjected to light or heat.

As mentioned, relatively lower molecular weight hydroxyalkylamines are most advantageously employed in the present invention. Diethanolamine, for example, is very suitably utilized for this purpose. Other lower molecular weight hydroxyalkylamines may also be empolyed including, for example, monoethanolamine, triethanolamine, mono-, di- or tri- isopropanolamine and beta-hydroxy butyl amines.

The present invention may be utilized for producing purified polymer products under atmospheric pressure at any temperature which is insufficient to cause decomposition of the materials in the particular purifying system being employed for the polymer. Generally temperatures between about 70° C. and about 80° C. are suitable. While, if they are desired, the treatment may be conducted at lower temperatures, the reaction rate under such conditions may be insufficient to allow the treatment to be completed within reasonably short periods of time.

Generally a sufficient amount of hydroxyalkylamine is employed to insure a substantially complete treatment of the heavy metal catalyst residues in the polymer. The relative proportions of hydroxyalkylamine and polymer employed may frequently be advantageously selected to best suit the reaction rates which are encountered in the various purifying systems which may be utilized.

The polymer product may often be conveniently treated with the hydroxyalkylamine while it is made up and held in a slurry with a hydrocarbon solvent. Such solvents as benzene, toluene, butane, pentane, hexane, cyclohexane, and commercially available mixtures of saturated hydrocarbons may be used for this purpose. Hydroxylamines, upon standing, will stratify in a heavier layer after being mixed with such a slurry. This facilitates the isolation of catalyst residues which are removed from the slurried polymer product by the hydroxyalkylamine. After a treatment with an unmodified hydroxyalkylamine, the catalyst residue containing hydroxyalkylamine may be withdrawn and disposed of after it stratifies in a separate layer from the purified polymer slurry.

If desired, however, the hydroxyalkylamines may be employed in alcoholic solutions to treat polymeric products in accordance with the method of the present invention. This technique tends to provide greater rates of reaction between the hydroxyalkylamine and the heavy metal catalyst residue in the polymer product being treated. However, when alcoholic solutions of the hydroxyalkylamine are employed it is usually not possible to isolate removed catalyst residues by the stratification technique which is available when an unmodified hydroxyalkylamine is employed.

After being treated with the hydroxyalkylamine, the purified polymer may be washed with water and other solvents such as alcohol, acetone and the like to remove traces of the reagent and of the hydrocarbon solvent utilized in preparing the polymer slurry. These washings may be done before or after the purified polymer is filtered from the hydrocarbon slurry. After being washed the purified polymer is dried to prepare it for subsequent applications in shaping molding, and other fabricating operations.

In order to further illustrate the invention, but without being restricted thereto, the following examples are given.

Example 1

Polyethylene was prepared according to the herein described Ziegler process by polymerizing relatively pure ethylene gas in the presence of an admixed aluminum triethyl and titanium tetrachloride catalyst. The polymerization reaction was conducted in a commercially available solvent comprised of mixed saturated hydrocarbons boiling between about 168 and 210°. C.

About 200 grams of the crude polyethylene was made up in a slurry with about 2 liters of the commercially available mixed hydrocarbon solvent. About 50 ml. of triethanolamine was added to this slurry with agitation. Using a nitrogen atmosphere to exclude air and continuing the agitation, the mixture was maintained at about 70° C. for about 30 minutes. Upon cooling, the mixture was transferred to a separatory funnel. A dark lower layer of triethanolamine which contained catalyst residue removed from the polymer was observed to form under the slurry in the separatory funnel. After removing the triethanolamine layer from the funnel, about 500 ml. of distilled water was added to the purified polymer slurry. The water was shaken in the slurry then withdrawn. After a second water wash the purified polyethylene was filtered, reslurried with about 1500 ml. of ethanol, refiltered and dried.

The polyethylene so treated was found to have a catalyst residue which contained about 93 p.p.m. by weight of aluminum compound and about 64 p.p.m. by weight of titanium compound. When this purified polymer was molded it had a color rating of about 3 on an arbitrarily selected, eight division color scale which proceeded through distinct shades of yellow and brown from a numerical rating of 1 for a very white polymer, comparable in color to the best and whitest commercially available polyethylene, to 8 for a very dark brown colored product. The samples for color evaluation were prepared by working the polymers on a roll mill at 170° C. for three minutes and then molding 0.070 inch thick specimens at 225° C.

When about 346 grams of the same crude polyethylene was treated in an identical manner with about 50 ml. of diethanolamine, the purified polymer was found to have a catalyst residue which contained about 180 p.p.m. by weight of aluminum compounds and about 240 p.p.m. by weight of titanium compounds. The diethanolamine purified polyethylene, however, molded to a product having a color rating of 1.

In contrast, when several separate portions of the crude polyethylene were treated with repeated washings in butanol to remove and decompose the catalyst residue according to an aftertreating procedure conventionally employed in the Ziegler process, they were found to have catalyst residues which contained between 60 to 800 p.p.m. by weight of aluminum compound and 200 to 2000 p.p.m. by weight of titanium compound. Of greater significance, however, is the fact that these conventionally purified polyethylenes, when molded, had color ratings from 4 to 6.

*Example II*

A second batch of crude polyethylene was prepared by the Ziegler process according to the procedure of Example I. About 25 grams of this crude polyethylene was filtered and mixed with a solution of about 10 ml. of diethanolamine in about 400 grams of butanol. The mixture was kept agitated while it was held at a temperature of about 75° C. for about 45 minutes. After being treated, the polyethylene was filtered, reslurried with butanol, heated and finally filtered. The filtered polymer was washed in ethanol and dried.

The polyethylene purified in this manner was found to have a catalyst residue which contained about 55 p.p.m. by weight of aluminum compound and about 150 p.p.m. by weight of titanium compound. The molded polyethylene had an excellent color rating of 1.

Since certain changes and modifications in the practice of the present invention can readily be entered into without substantially departing from its spirit and scope, it is to be understood that all the foregoing description be construed as being merely illustrative of the invention.

What is claimed is:
1. Method for removing and inactivating heavy metal constituents in catalyst residues from polymerized ethylenically unsaturated materials prepared with a heavy metal catalyst formed by admixing a strong reducing agent with compounds selected from the group consisting of the group IV-B, V-B and VI-B metals of the periodic system and containing catalyst residues in which there are incorporated heavy metal constituents after having been polymerized which comprises treating the polymerized product, containing said heavy metal constituents in the catalyst residue, with a lower molecular weight hydroxyalkylamine and subsequently isolating the purified and stabilized polymerized product.

2. The method of claim 1 wherein the hydroxyalkylamine is diethanolamine.

3. The method of claim 1 wherein the hydroxyalkylamine is triethanolamine.

4. Method for removing and inactivating heavy metal constituents in catalyst residues from polyethylene prepared with a heavy metal catalyst formed by admixing an aluminum alkyl with compounds selected from the group consisting of the group IV-B, V-B and VI-B metals of the periodic system and containing catalyst residues in which there are incorporated heavy metal constituents after having been polymerized which comprises preparing a slurry with a hydrocarbon solvent and the polyethylene product containing said heavy metal constituents in the catalyst residues; treating the polyethylene in the slurry by mixing the slurry with a lower molecular weight hydroxyalkylamine which does not dissolve in the slurry; separating the hydroxylamine by stratification from the hydrocarbon slurry carrying the purified and stabilized polyethylene product; and subsequently isolating the purified and stabilized polyethylene.

5. The method of claim 4 wherein the polyethylene is prepared in the presence of a catalyst formed by admixing an aluminum alkyl with a titanium salt.

6. The method of claim 4 wherein the polyethylene slurry is treated with the hydroxyalkylamine at a temperature between about 70° C. and about 80° C.

7. The method of claim 4 wherein the hydroxyalkylamine is diethanolamine.

8. The method of claim 4 wherein the hydroxyalkylamine is triethanolamine.

9. Method for removing and inactivating heavy metal constituents in catalyst residues from polyethylene prepared with a heavy metal catalyst formed by admixing an aluminum alkyl with compounds selected from the group consisting of the group IV-B, V-B and VI-B metals of the periodic system and containing catalyst residues in which there are incorporated heavy metal constituents after having been polymerized which comprises treating the polyethylene, containing said heavy metal constituents in the catalyst residues, with an alcoholic solution of a hydroxyalkylamine and subsequently isolating the purified and stabilized polyethylene.

10. The method of claim 9 wherein the polyethylene is prepared in the presence of a catalyst formed by admixing an aluminum alkyl with a titanium salt.

11. The method of claim 9 wherein the polyethylene is treated with the hydroxyalkylamine at a temperature between about 70° C. and about 80° C.

12. The method of claim 9 wherein the hydroxyalkylamine is diethanolamine.

13. The method of claim 9 wherein the hydroxyalkylamine is triethanolamine.

14. The method of claim 9 wherein the hydroxyalkylamine is dissolved in butanol.

15. Method for removing and inactivating heavy metal constituents in catalyst residues from polyethylene prepared with a heavy metal catalyst formed by admixing an aluminum alkyl with compounds selected from the group consisting of the group IV-B, V-B and VI-B metals of the periodic system and containing catalyst residues in which there are incorporated heavy metal constituents after having been polymerized which comprises dispersing the polyethylene in a hydrocarbon solvent to form a polyethylene slurry; then treating the polyethylene, containing said heavy metal constituents in the catalyst residues, while it is in said slurry with an alcoholic solution of a hydroxyalkylamine by adding said alcoholic solution of said hydroxyalkylamine to said slurry; and subsequently isolating the purified and stabilized polyethylene from said slurry.

16. The method of claim 15, wherein the polyethylene is prepared in the presence of a catalyst formed by admixing an aluminum alkyl with a titanium salt.

17. The method of claim 15, wherein the polyethylene in said slurry is treated with the alcoholic solution of the hydroxyalkylamine at a temperature between about 70° C. and about 80° C.

References Cited in the file of this patent

FOREIGN PATENTS 533,362      Belgium _____ May 16, 1955

OTHER REFERENCES

Mellor: "Comprehensive Treatise on Inorganic and Theoretical Chemistry." Published by Longmans, Green & Co. (New York), 1927. Page 7 relied upon.

Mitchell: "Recent Advances in Analytical Chemistry." Published by Blakiston's Son and Co., Inc. (Philadelphia), 1931. Page 224 is relied upon.